United States Patent Office 3,541,212
Patented Nov. 17, 1970

3,541,212
AGRICULTURAL BACTERICIDAL COMPOSITION
Shoji Kamimura and Hiroshi Takahashi, Tokyo, Japan, assignors to Sankyo Company Limited, Tokyo, Japan
No Drawing. Filed Jan. 23, 1968, Ser. No. 699,789
Int. Cl. A01n 9/22; A61k 27/00
U.S. Cl. 424—251                      4 Claims

ABSTRACT OF THE DISCLOSURE

To prevent plant diseases of plants attacked or to be attacked by pathogenic bacteria, the invention proposes the application to the plants of 2-aminoquinazoline or its acid addition salts.

---

This invention relates to an agricultural bactericide and a method of combatting plant diseases caused by various pathogenic bacteria by employing as an active agent 2-aminoquinazoline or an acid addition salt thereof.

More particularly, it relates to an agricultural bactericidal composition which contains as an essential active ingredient a bactericidal amount of a compound selected from the group consisting of 2-aminoquinazoline and acid addition salts thereof. It is also concerned with a novel method of combatting plant diseases caused by various pathogenic bacteria which comprises treating plants attacked or to be attacked by pathogenic bacteria with a bactericidal composition containing as an active ingredient said active compound.

There have, heretofore, been found a large number of bacterial plant diseases and many useful plants or crops are frequently and badly damaged by those bacterial diseases. Especially, with respect to such useful plants as rice plants, tomatoes and citrus trees, there are known such injurious bacterial diseases as bacterial leaf blight caused by *Xanthomonas oryzae*, canker caused by *Xanthomonas citri* and bacterial canker caused by *Corynebacterium michiganense*. Various attempts to find out a bactericidal agent for combatting these bacterial diseases have been made in the art.

However, such previous attempts have not practically succeeded in obtaining a satisfactory result.

Unexpectedly, it has now been found that 2-aminoquinazoline and acid addition salts thereof exhibit high bactericidal activity against various pathogenic bacteria with no appreciable degree of phytotoxicity even at a higher concentration.

It is, accordingly, a principal object of this invention to provide a new agricultural bactericidal composition which contains as an active ingredient a bactericidal amount of 2-aminoquinazoline or acid addition salts thereof.

Another object of this invention is to provide a new and effective method of combatting plant diseases caused by various pathogenic bacteria which comprises treating plants attacked or to be attacked by such pathogenic bacteria with an agricultural bactericidal composition containing as an active ingredient said active compound.

These and other objects of this invention will become apparent from the following description of this invention.

The active base compound of this invention, i.e. 2-aminoquinazoline is a known substance and may be readily prepared in a conventional manner, for example, by reacting O-aminobenzaldehyde with guanidine nitrate in the presence of potassium carbonate according to the teachings of J. Chem. Soc., 1956, 3511. The acid addition salts of 2-aminoquinazoline can be easily obtained by treating said base compound with any inorganic or organic acid or equivalents thereof, which will not adversely affect a bactericidal activity of said base compound. Suitable examples of those acids which may be satisfactorily employed to form the corresponding acid addition salt of 2-aminoquinazoline are inorganic acids such as, for example, hydrohalic acid, e.g. hydrochloric or hydrobromic acid, nitric, sulfuric or phosphoric acid, and organic acids such as aliphatic monocarboxylic acid, e.g. formic, acetic, propionic, butyric or palmitic acid, aliphatic halomonocarboxylic acid, e.g. monochloroacetic or trichloroacetic acid, aliphatic oxymonocarboxylic acid, e.g. lactic acid, aliphatic dicarboxylic acid, e.g. oxalic, malonic or succinic acid, aliphatic oxydicarboxylic acid, e.g. malic or tartaric acid, aromatic carboxylic acid, e.g. benzoic acid and aromatic sulfonic acid, e.g. p-toluene sulfonic acid. Thus, typical examples of the acid addition salts of 2-aminoquinazoline which may be effectively employed as an active ingredient in this invention are hydrochloride, hydrobromide, nitrate, sulfate, phosphate, formate, acetate, propionate, butyrate, palmitate, monochloroacetic, trichloroacetate, lactate, oxalate, malonate, succinate, malate, tartrate, benzoate and p-toluene sulfonate.

The active ingredient used in the composition according to this invention may be conveniently formulated by known procedures and used in various forms including liquids, dusts, granules and wettable powders, etc.

Liquids may be prepared by dissolving the active ingredient in a suitable solvent with or without one or more of numerous known adjuvants such as emulsifying agents, wetting agents, or dispersing agents. Suitable solvents include water, alcohols such as methanol or ethanol, acetone, benzene, toluene, xylenes, solvent naphtha, petroleum ether, the mixture thereof and the like. Suitable adjuvants may be any of those which is ordinarily employed in the art, and include, for example, the condensation products of alkylene oxides with phenols or organic acids, alkylarylsulfonates, dialkyl sulfosuccinate, polyoxyethylene ether or ester derivatives of alcohols or acids and the like.

Dusts and granules may be prepared by mixing said active compound in and on an inert solid carrier by a conventional procedure. Suitable solid carriers for use in the composition of this invention include, for example, talc, pyrophylite, kieselguhr, clay, bentonite, diatomaceous earth, kaolin, precipitated chalk and the like.

Wettable powders may be prepared by mixing the said active compound with one or more of the aforementioned solid carriers and suitable dispersing agents. Suitable dispersing agents include, for examples, those aforementioned adjuvants such as alkylbenzenesulfonates, lignosulfonates or polyoxyalkylene glycol ethers or esters.

The concentration of the active compound in the composition of this invention may normally be from about 0.1 to about 95% by weight, and preferably from about 0.5 to about 50% by weight, based upon the total weight of the composition, although the amount of the active ingredient employed will largely depend upon such factors as the type and severity of diseases, the form of a composition or the specific active compound. It should be, however, understood that the amount of an active compound employed be not critical feature of this invention. Two or more of said active ingredients may be conveniently incorporated into the agricultural bactericidal composition of this invention.

The agricultural bactericidal composition of this invention may also include other known bactericides, fungicides, insecticides, fertilizers and/or other adjuvants.

To illustrate the excellent effect of the composition of this invention against various plant diseases, the results of testings with representative active ingredients in the composition of this invention are given hereinbelow:

EXPERIMENT 1

Test for curative effects of the active ingredient of this invention against bacterial leaf blight caused by the attack of *Xanthomonas oryzae*.

Test procedure: Rice plants in a group of 3 pots were inoculated by spraying thereon with a pathogenic microorganism, *Xanthomonas oryzae*, in the form of a concentrated suspension. These pots were moved into a room maintained at 26° C. and a relative humidity above 95%, and then allowed to stand for 48 hours. The test compound, 2-aminoquinazoline, was applied to the host plants by spraying thereon at the dose rate indicated hereinbelow. The pots were moved into a green house maintained at a temperature ranging from 24° C. to 28° C. After two weeks, visual investigation was made on disease caused by the attack of said pathogenic bacteria in each host plant, and then degree of disease (expressed as a percentage) was calculated according to the following equation:

$$\text{Degree of disease (percent)} = \frac{\text{number of diseased plant}}{\text{total number of host plant employed}} \times 100$$

Results: The results are given in the following Table I.

TABLE I

| Dose rate, p.p.m. | Degree of disease, percent | Phytotoxicity |
|---|---|---|
| 1,000 | 0.1 | |
| 300 | 5.0 | |
| 100 | 11.0 | |

EXPERIMENT 2

Test for protective effects of the active ingredient of this invention against canker caused by the attack of *Xanthomonas citri*.

Test procedure: Several groups of two-years aged seedlings of Chinese citrus (*Citrus Natsudaidai Hayata*) planted in pots, each group consisting of 3 pots, were applied by spraying thereon with a 100 ml. portion of a solution of the test compound, 2-aminoquinazoline or hydrochloride thereof, at the dose rate indicated hereinbelow. After air-drying, such seedlings were inoculated by spraying thereon with spores of a pathogenic microorganism, *Xanthomonas citri*, and then kept in a room maintained at a temperature of 28° C. and a relative humidity above 95%. Thereafter, these pots were exposed to the air by carrying them outdoors. After 30 days of the exposure, the number of diseased leaves was investigated on newly grown twigs of each plant. Average degree of diseased leaves on each group was calculated from the number obtained as set forth above.

Results: The results are given in the following Table II.

TABLE II

| Test compound | Dose rate, p.p.m. | Degree of disease, percent | Phytotoxicity |
|---|---|---|---|
| 2-aminoquinazoline | 1,000 | 10.3 | |
| | 300 | 21.0 | |
| | 100 | 30.5 | |
| 2-aminoquinazoline hydrochloride (m.p. ca. 245° C.) | 1,000 | 0.4 | |
| | 300 | 8.6 | |
| | 100 | 17.3 | |

EXPERIMENT 3

Test for curative effects of the active ingredient of this invention against bacterial canker caused by the attack of *Corynebacterium michiganense*.

Test procedure: Tomato plant of 60 cm. tall was used as a host plant. Pathogenic microorganism, *Corynebacterium michiganense*, incubated in the culture medium of peptone-sucrose agar were inoculated around the tomato stem at 10 cm. above the soil surface, the two position of which stem had been treated with a 0.2 ml. portion of a solution of the test compound, 2-aminoquinazoline, by means of injection. Three to seven days after the inoculation, the size of lesions in diseased stem was measured.

Results: The results are summarized in the following Table III.

TABLE III

| Dose rate, (p.p.m.) | Size of lesions, cm. | Phytotoxicity |
|---|---|---|
| 1,000 | 0 | |
| 300 | 0 | |
| 100 | 0.5 | |
| 0 (untreated) | 5.0 | |

It will be apparent from the Tables I, II and III that the active ingredients in this invention exhibit high bactericidal activity without any degree of phytotoxicity.

The following examples are given only for the purpose of illustrating of this invention. All parts are given by weight unless otherwise stated.

EXAMPLE 1

Ten parts of 2-aminoquinazoline, 83 parts of methanol and 7 parts of an emulsifying agent, "Newcol," (registered trade mark of an emulsifying agent manufactured and sold by Nihon Nyukazai K.K., Japan) were thoroughly mixed and dissolved to obtain an emulsifiable concentrate.

EXAMPLE 2

Ten parts of 2-aminoquinazoline, 87 parts of clay, 2 parts of polyoxyethylene nonyl phenyl ether and 1 part of polyvinyl alcohol were uniformly mixed and finely pulverized to obtain a wettable powder.

EXAMPLE 3

One part of 2-aminoquinazoline hydrochloride, 98 parts of clay and 1 part of calcium silicate were uniformly mixed and finely pulverized to obtain a dust.

What is claimed is:

1. A method of combatting bacterial plant diseases which comprises applying to plants attacked by pathogenic bacteria a bactericidal amount of a compound selected from the group consisting of 2-aminoquinazoline and its acid addition salt selected from the group consisting of hydrochloride, hydrobromide, nitrate, sulfate, phosphate, formate, acetate, propionate, butyrate, palmitate, monochloroacetate, trichloroacetate, lactate, oxalate, malonate, succinate, malate, tartrate, benzoate and p-toluene sulfonate.

2. The method according to claim 1 wherein said acid addition salt is hydrochloride.

3. A method of preventing bacterial plant diseases which comprises applying to plants to be attacked by pathogenic bacteria a compound selected from the group consisting of 2-aminoquinazoline and its acid addition salt selected from the group consisting of hydrochloride, hydrobromide, nitrate, sulfate, phosphate, formate, acetate, propionate, butyrate, palmitate, monochloroacetate, trichloroacetate, lactate, oxalate, malonate, succinate, malate, tartrate, benzoate, and p-toluene sulfonate, said compound being applied in an amount effective to prevent bacterial plant diseases.

4. The method according to claim 3 wherein said acid addition salt is hydrochloride.

References Cited

UNITED STATES PATENTS 2,461,950  2/1949  Wolf _____ 260—256.4

OTHER REFERENCES

Dewar, M. J. S., J. of the Chemical Soc., 1944, pp. 619–623.

SAM ROSEN, Primary Examiner